United States Patent
Tian et al.

(10) Patent No.: US 12,423,619 B2
(45) Date of Patent: Sep. 23, 2025

(54) CLASS-SPECIFIC PREDICTOR IMPORTANCE

(71) Applicant: INTERNATIONAL BUSINESS MACHINES CORPORATION, Armonk, NY (US)

(72) Inventors: Lei Tian, Xi'an (CN); Han Zhang, Xi'an (CN); Ning Zhang, Xi'an (CN); Na Zhao, Xi'an (CN); Li Na Wang, Xi'an (CN); Rong Hong Wan, Xi'an (CN)

(73) Assignee: International Business Machines Corporation, Armonk, NY (US)

( * ) Notice: Subject to any disclaimer, the term of this patent is extended or adjusted under 35 U.S.C. 154(b) by 663 days.

(21) Appl. No.: 17/709,646

(22) Filed: Mar. 31, 2022

(65) Prior Publication Data

US 2023/0316125 A1  Oct. 5, 2023

(51) Int. Cl.
*G06N 20/00* (2019.01)
*G06F 16/22* (2019.01)
*G06N 5/02* (2023.01)

(52) U.S. Cl.
CPC ......... *G06N 20/00* (2019.01); *G06F 16/2246* (2019.01); *G06N 5/02* (2013.01)

(58) Field of Classification Search
None
See application file for complete search history.

(56) References Cited

U.S. PATENT DOCUMENTS

| | | | | |
|---|---|---|---|---|
| 7,406,452 B2 * | 7/2008 | Forman | ................... | G06N 20/00 706/15 |
| 8,355,997 B2 * | 1/2013 | Kirshenbaum | .......... | G06N 5/02 707/705 |

(Continued)

FOREIGN PATENT DOCUMENTS

CN     111199314 A     5/2020

OTHER PUBLICATIONS

Mell, P. et al., The NIST Definition of Cloud Computing, National Institute of Standards and Technology, U.S. Dept. of Commerce, Special Publication 800-145, Sep. 2011, 7 pg.

(Continued)

*Primary Examiner* — Maikhanh Nguyen
(74) *Attorney, Agent, or Firm* — CHIP LAW GROUP

(57) ABSTRACT

Determining a class-specific predictor indicator importance can include generating, using machine learning, a prediction model having a tree structure including nodes, class label subgroups, and class-specific predictor indicators. A class-specific predictor indicator importance can be generated for a selected class-specific predictor indicator by merging a term predictor indicator frequency and a purity predictor indicator frequency at each instance of the selected class-specific predictor indicator within one or more nodes of the tree structure. A representation of the tree structure displayed in a graphical user interface can depict each path between a root node of the tree structure and a leaf node mapped to the selected class label subgroup having a node containing an instance of the selected class-specific predictor indicator in a manner that contrasts with other paths between the root node and other leaf nodes of the tree structure.

20 Claims, 12 Drawing Sheets

(56) References Cited

U.S. PATENT DOCUMENTS

| | | | | |
|---|---|---|---|---|
| 8,589,317 B2* | 11/2013 | Paquet | ............ | G06N 20/00 |
| | | | | 706/12 |
| 10,824,959 B1* | 11/2020 | Chatterjee | ............ | G06N 20/00 |
| 11,593,680 B2* | 2/2023 | Zhou | ............ | G06N 3/084 |
| 11,631,497 B2* | 4/2023 | Asthana | ............ | G06N 20/00 |
| | | | | 705/2 |
| 11,805,089 B2* | 10/2023 | Bastide | ............ | G06N 5/022 |
| 2020/0111572 A1* | 4/2020 | Bergen | ............ | G16H 15/00 |
| 2022/0188674 A1* | 6/2022 | Liao | ............ | G06N 5/045 |

OTHER PUBLICATIONS

"A system and method for predictor importance analysis in time series data," IP.com Prior Art Database, Technical Disclosure No. IPCOM000251875D, Dec. 8, 2017, 4 pg.

Hapfelmeier, A. et al., "Estimation of a Predictor's Importance by Random Forests When There Is Missing Data: Risk Prediction in Liver Surgery using Laboratory Data," The International Journal of Biostatistics. Nov. 1, 2014;10 (2):165-83.

"Lime: Explaining the predictions of any machine learning classifier," [online] © 2022 GitHub, Inc. [retrieved Feb. 10, 2022], retrieved from the Internet: <https://github.com/marcotcr/lime>, 6 pg.

Trzesiok, M., "The importance of predictor variable for individual classes in SVM," Acta Universitatis Lodziensis, Folia Oeconomica, 2010;235:185-93.

Ribeiro, M.T. et al., ""Why Should I Trust You?": Explaining the Predictions of Any Classifier," InProceedings of the 22nd ACM SIGKDD International Conference on Knowledge Discovery and Data Mining, Aug. 13, 2016, pp. 1135-1144.

Greenwell, B.M. et al., "A Simple and Effective Model-Based Variable Importance Measure," arXiv preprint arXiv:1805.04755. May 12, 2018.

* cited by examiner

CLASS-SPECIFIC PREDICTOR IMPORTANCE

TECHNICAL FIELD

This disclosure relates to machine learning, and more particularly, to generating predictions using classification and regression models displayable graphically as tree structures.

BACKGROUND

Machine learning is widely used in a vast array of fields such as bioinformatics, automated trading, drug discovery, fraud detection, and speech recognition. One broad approach in machine learning works by partitioning an input space into distinct regions and assigning a simple model (e.g., a constant) to each region. This can be viewed as a combination model technique in which each model is responsible for making predictions at any given point in the input space. Given an input (e.g., feature vector), a specific model prediction can be made by a sequential decision-making process corresponding to traversing a tree-like structure that splits into branches at each node. Classification and regression trees, for example, can be constructed by recursively partitioning the input space and fitting a prediction model within each partition. Accordingly, the partitioning can be represented graphically as a tree structure, also referred to as a decision tree.

The graphical representation makes the model predictions' dependency on predictors (e.g., features of a feature vector) more intuitive and more readily explainable to non-technical users. Another advantage of tree-based machine learning is the ability to process both continuous and categorical predictors. Still another advantage is that the datasets used in training a tree-based machine learning model need not be normalized or otherwise pre-processed, and no special handling of missing values is necessary. Yet another advantage of tree-based machine learning models is the models' strong capability for handling non-linear relationships between predictors and labeled/target data.

SUMMARY

In one or more embodiments, a method for can include using machine learning to generate a prediction model having a tree structure including multiple nodes, a plurality of class label subgroups, and class-specific predictor indicators. The method can include causing a first display, in a graphical user interface, of a representation of the tree structure. The method can include receiving, from the graphical user interface, a selected class label subgroup from the displayed plurality of class label subgroups and a selected class-specific predictor indicator from the displayed class-specific predictor indicators. The method can include generating a class-specific predictor indicator importance for the selected class-specific predictor indicator by merging a term predictor indicator frequency and a purity predictor indicator frequency at each instance of the selected class-specific predictor indicator within one or more nodes of the tree structure. The method can include causing a second display, in the graphical user interface, of the representation of the tree structure. In the second display, each path between a root node of the tree structure and a leaf node mapped to the selected class label subgroup having a node containing an instance of the selected class-specific predictor indicator can be depicted in a manner that contrasts with other paths between the root node and other leaf nodes of the tree structure.

In one or more embodiments, a system includes one or more processors configured to initiate operations. The operations can include using machine learning to generate a prediction model having a tree structure including multiple nodes, a plurality of class label subgroups, and class-specific predictor indicators. The operations can include causing a first display, in a graphical user interface, of a representation of the tree structure. The operations can include receiving, from the graphical user interface, a selected class label subgroup from the displayed plurality of class label subgroups and a selected class-specific predictor indicator from the displayed class-specific predictor indicators. The operations can include generating a class-specific predictor indicator importance for the selected class-specific predictor indicator by merging a term predictor indicator frequency and a purity predictor indicator frequency at each instance of the selected class-specific predictor indicator within one or more nodes of the tree structure. The operations can include causing a second display, in the graphical user interface, of the representation of the tree structure. In the second display, each path between a root node of the tree structure and a leaf node mapped to the selected class label subgroup having a node containing an instance of the selected class-specific predictor indicator can be depicted in a manner that contrasts with other paths between the root node and other leaf nodes of the tree structure.

In one or more embodiments, a computer program product includes one or more computer readable storage media having instructions stored thereon. The instructions are executable by a processor to initiate operations. The operations can include using machine learning to generate a prediction model having a tree structure including multiple nodes, a plurality of class label subgroups, and class-specific predictor indicators. The operations can include causing a first display, in a graphical user interface, of a representation of the tree structure. The operations can include receiving, from the graphical user interface, a selected class label subgroup from the displayed plurality of class label subgroups and a selected class-specific predictor indicator from the displayed class-specific predictor indicators. The operations can include generating a class-specific predictor indicator importance for the selected class-specific predictor indicator by merging a term predictor indicator frequency and a purity predictor indicator frequency at each instance of the selected class-specific predictor indicator within one or more nodes of the tree structure. The operations can include causing a second display, in the graphical user interface, of the representation of the tree structure. In the second display, each path between a root node of the tree structure and a leaf node mapped to the selected class label subgroup having a node containing an instance of the selected class-specific predictor indicator can be depicted in a manner that contrasts with other paths between the root node and other leaf nodes of the tree structure.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

The inventive arrangements are illustrated by way of example in the accompanying drawings. The drawings, however, should not be construed to be limiting of the inventive arrangements to only the particular implementations shown. Various aspects and advantages will become apparent upon review of the following detailed description and upon reference to the drawings.

DETAILED DESCRIPTION

Figure 1A:
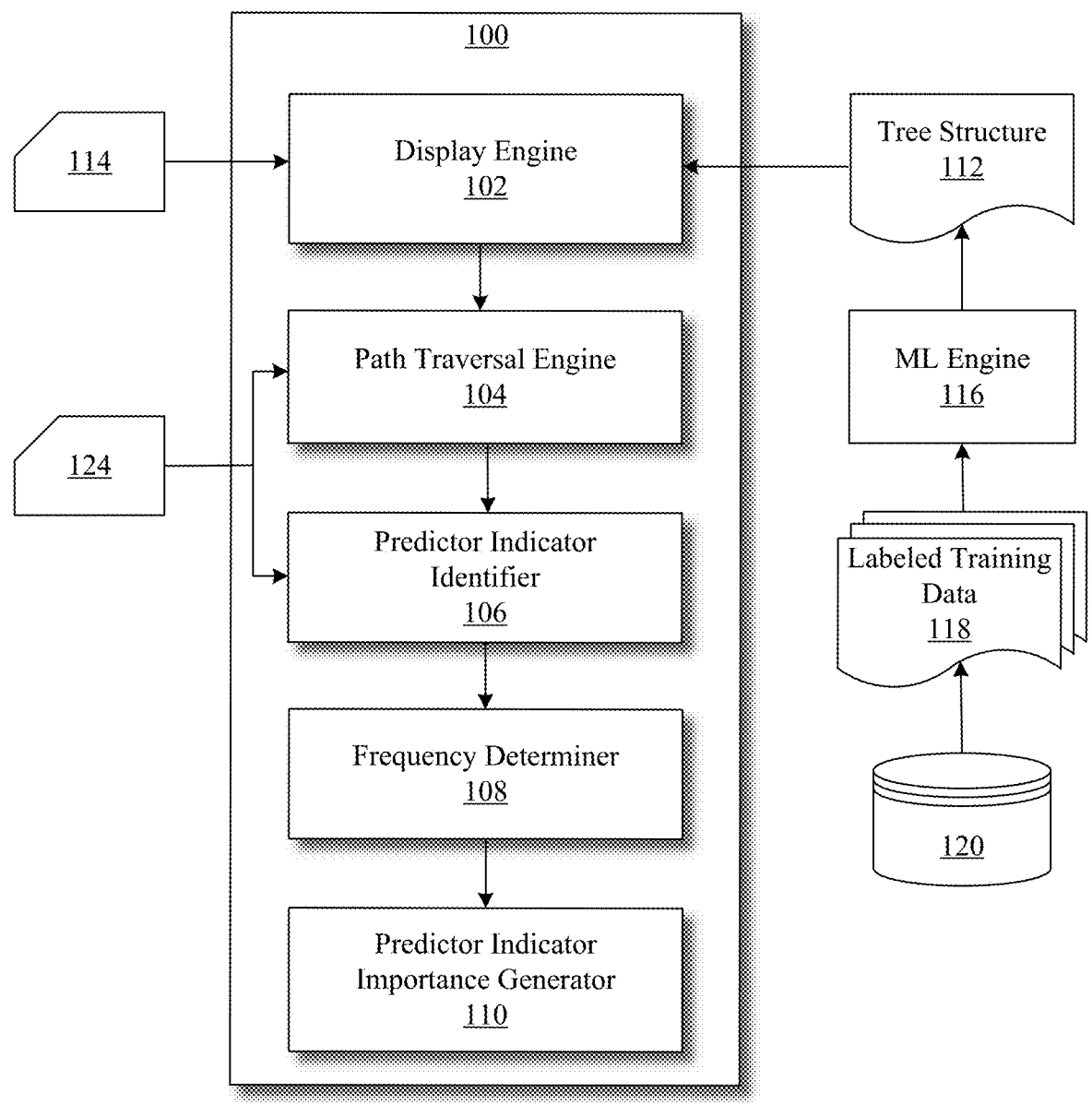
FIGS. 1A-1C illustrate an example system for determining a class-specific importance of a predictor indicator of a tree-based model generated by machine learning.

While the disclosure concludes with claims defining novel features, it is believed that the various features described within this disclosure will be better understood from a consideration of the description in conjunction with the drawings. The process(es), machine(s), manufacture(s) and any variations thereof described herein are provided for purposes of illustration. Specific structural and functional details described within this disclosure are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to machine learning, and more particularly, to generating predictions using machine learning-based classification and regression models displayable graphically as decision trees. A classification tree constructed through machine learning, given values of one or more independent variables, can classify a dependent variable or observation into a finite number of unordered values, each representing a distinct category. The classification tree is trained through supervised learning with the prediction error measured in terms of a misclassification cost function. A regression tree, given values of one or more independent variables, generates a continuous or ordered discrete value for the dependent variable. The regression tree is trained through supervised learning with the prediction error typically measured by a squared difference between observed and predicted values. With respect to decision trees generally, training data as well as inputs can be represented by feature vectors, matrices, or higher-ordered tensors. The individual elements of a tensor (e.g., feature vector) are specific values of the independent variables, or equivalently, the predictors. For consistency, the term "predictor" is used throughout this disclosure to denote the variables whose values are used to train a tree-based machine learning model and on which model predictions for a target input are based.

Tree-based machine learning models provide distinct advantages, including those noted above. As noted, for example, the tree structure visually depicts the interrelation between each predictor and how each influences a model prediction. Additionally, predictor importance analysis can determine a predictor's total contribution to the model's prediction. For example, the analysis may reveal that in using a tree-based classification model to predict drug efficacy, blood pressure or the level of sodium in the blood of a patient is a strong predictor of which among multiple classes of drugs is likely to be the most effective in treating the patient. Apart from indicating the total contribution of a predictor to the overall model, however, the analysis does not reveal the importance that different values of the predictor have on a specific class or category of the classification model.

The systems, methods, and computer program products disclosed herein are capable of determining a class-specific predictor importance for each predictor with respect to each specific class of a tree-based model. Moreover, the inventive arrangements disclosed are capable of determining a class-specific importance for a specific value or range of values of each predictor—that is, a class-specific importance of a predictor indicator. As defined herein, the term "predictor indicator" means a specific value (nominal, ordinal, interval, or ratio) or a range of continuous real numbers of a predictor. For a categorical predictor, the predictor indicator can be a value, such as a real number, a nominal value (e.g., x, y, or z) or an ordinal value (e.g., high or low). For a continuous predictor, the predictor indicator can be a single numerical value or a range of numerical values, including cascaded or nested ranges of numerical values. The "class-specific predictor indicator importance," as defined herein, means a quantitative measurement that measures a strength of association between a class-specific predictor indicator and a selected class-label subgroup of a tree-based prediction model An aspect of the inventive arrangements is an elaboration of the dimensionality of analysis using a tree-based prediction model. By adding to the dimensionality of the prediction model, the inventive arrangements extend or improve the prediction model. A system implementing the inventive arrangements not only can determine which predictor or predictors correlate with specific classes of a classification model or predicted values of a regression model, but which predictor indicators (predictor values or ranges of values) correlate with specific classes. The class-specific predictor indicator importance can be used, for example, in medical diagnosis and treatment, in various research endeavors, and in business analytics.

For example, with respect to the above-referenced model for determining drug efficacy among drugs labeled A, B, or C, a system-determined predictor indicator importance may reveal that a patient exhibiting low blood pressure or being over age 50 is most likely to respond successfully to drug C. Thus, based on the system-generated predictor indicator importance, the system implementing a tree-based classification model can reveal rapidly and reliably to a user (e.g., physician) that a patient having low blood pressure or over age 50 should be treated with drug C. For example, the class-specific predictor indicator importance of one or more prediction model predictors can reveal which of multiple advertisements strategies is most likely to be most effective if directed at males less than the age of thirty.

Further aspects of the embodiments described within this disclosure are described in greater detail with reference to the figures below. For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

Figure 1B:
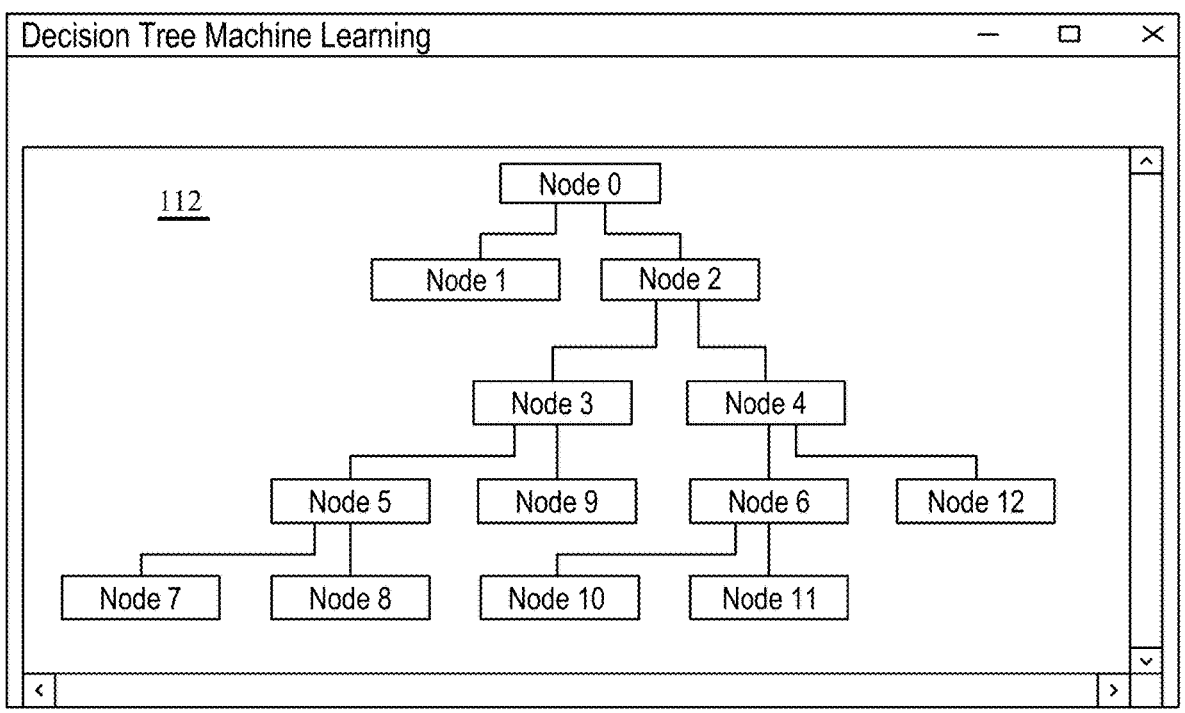
Figure 1C:
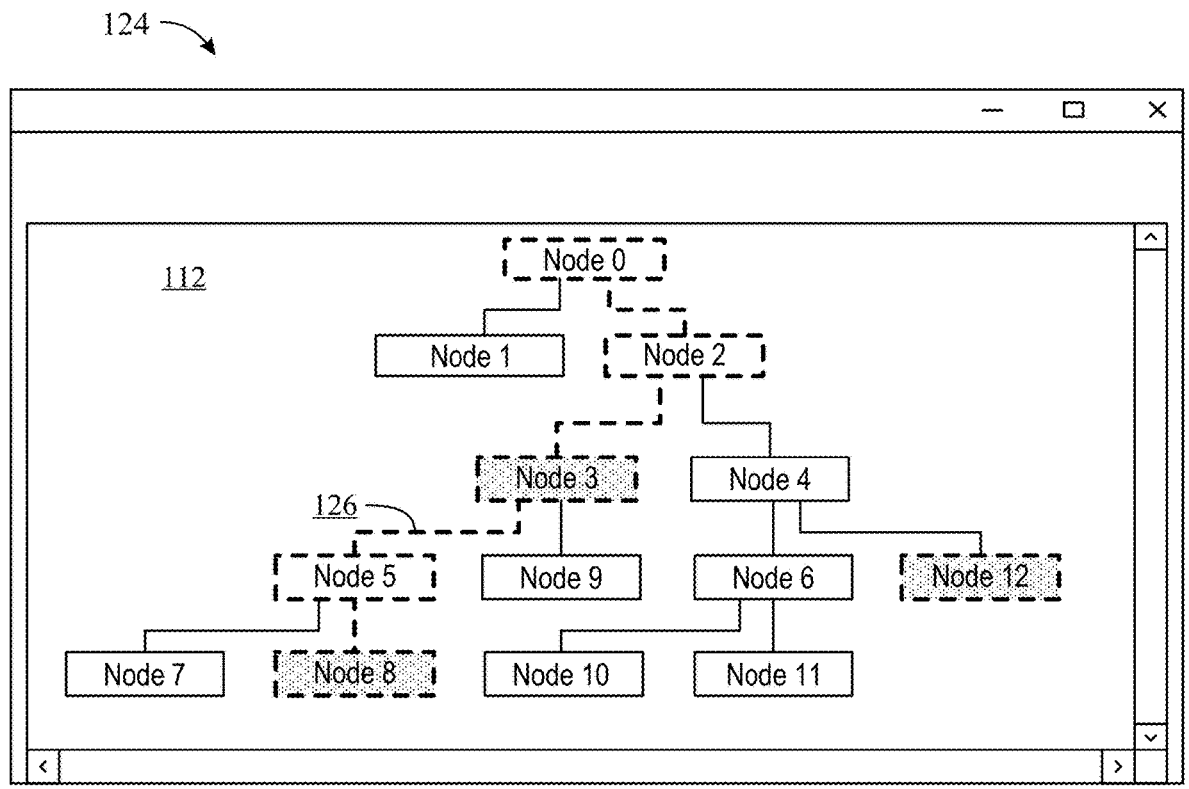
Figure 2A:
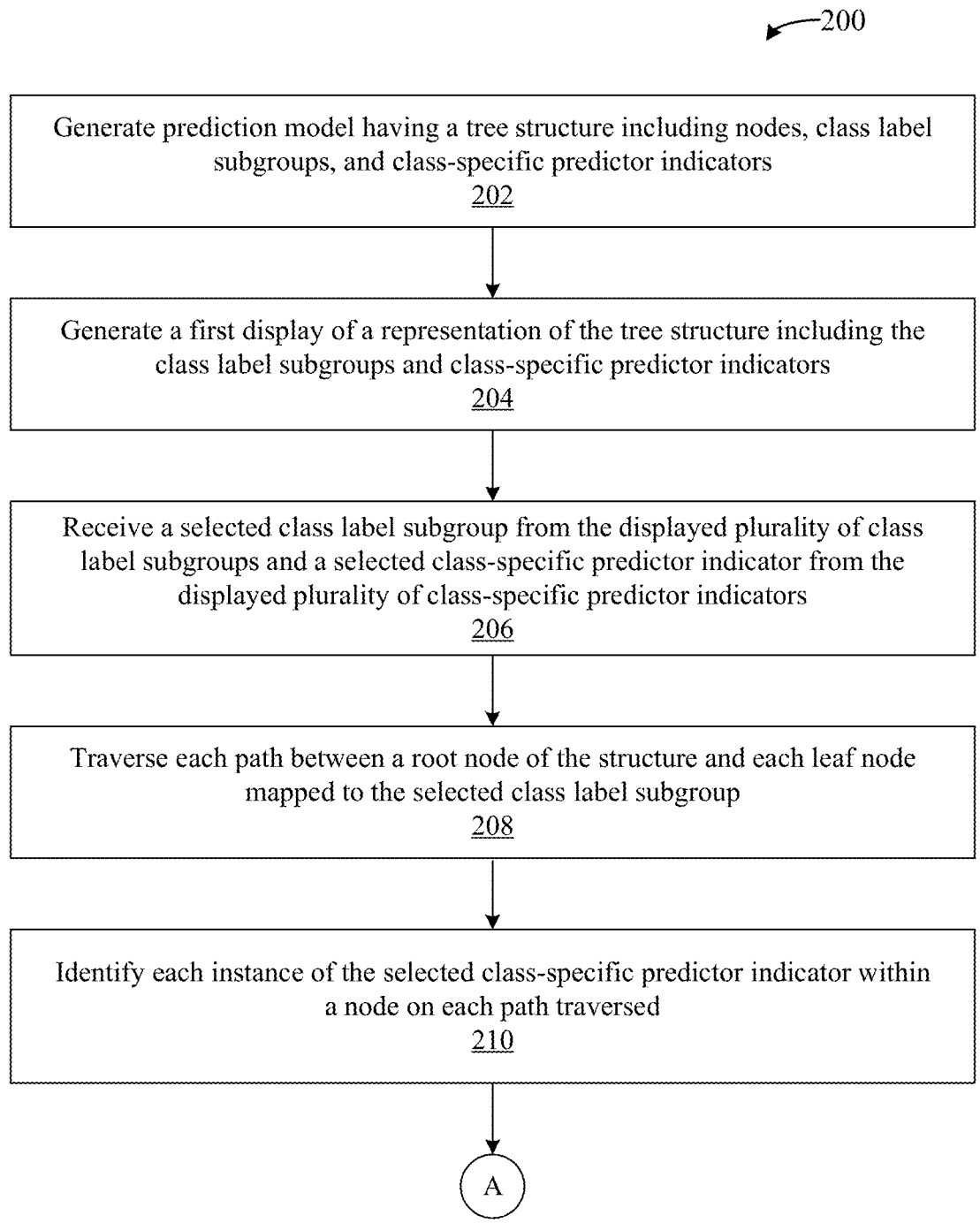
FIGS. 2A and 2B illustrate an example method performed by the system of FIG. 1.
Figure 2B:
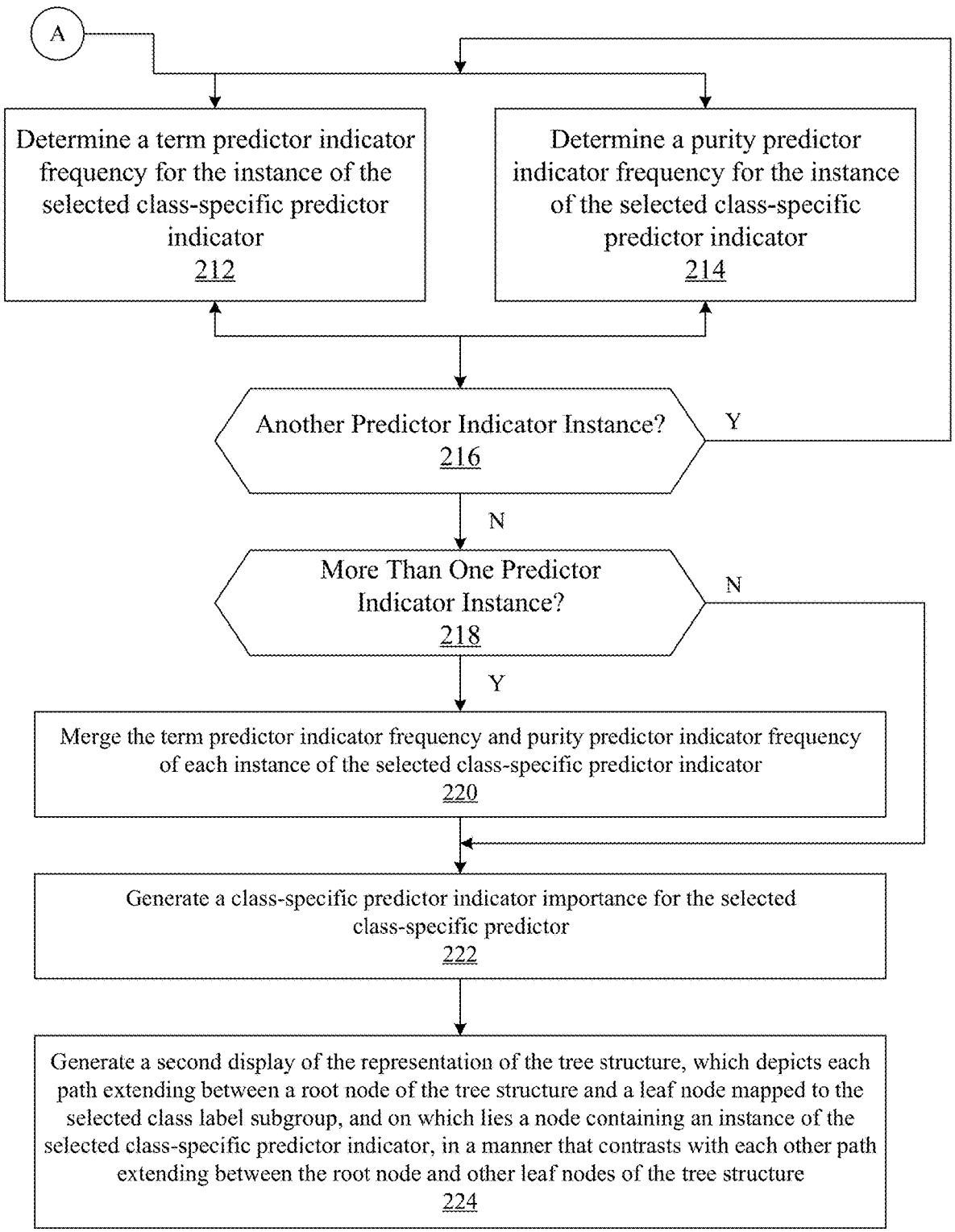

Referring initially to FIGS. 1A, 1B, 1C, and FIGS. 2A and 2B, FIGS. 1A-1C illustrate an example system for determining a class-specific importance of a predictor indicator of a tree-based model (system) 100, and FIG. 2 illustrates an example method 200 performed by system 100. System 100 illustratively includes display engine 102, path traversal engine 104, predictor indicator identifier 106, frequency determiner 108, and predictor indicator importance generator 110.

Figure 4:
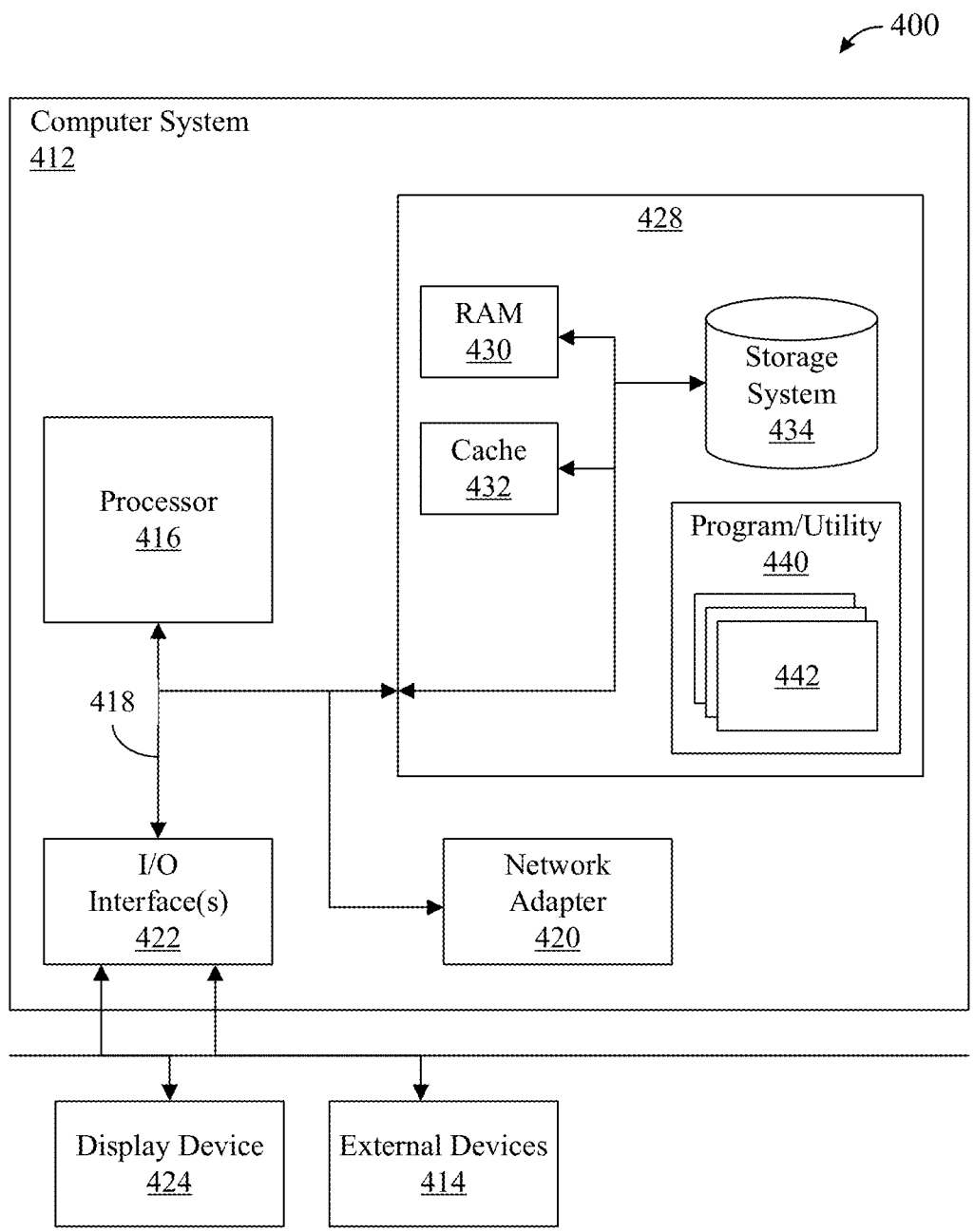
FIG. 4 illustrates a computing node for implementing the system of FIG. 1.

In various embodiments, display engine 102, path traversal engine 104, predictor indicator identifier 106, frequency determiner 108, and predictor indicator importance generator 110 can be implemented in hardware (e.g., dedicated hardwired circuitry), software (e.g., program code executed by one or more processors), or a combination thereof. For example, system 100 in certain embodiments is implemented in a computing node, such as computing node 400 (e.g., cloud-based server), in which system 100 comprises program code that is electronically stored in a memory, such as memory 428, and executes on one or more processors, such as processor 416 of computer system 412 (FIG. 4).

Operatively, at block 202, machine learning engine 116 generates a prediction model having tree structure 112 including multiple nodes, multiple class label subgroups, and multiple class-specific predictor indicators. The multiple nodes of tree structure 112 include a root node connected to multiple leaf nodes via other, branch-connected intermediate nodes. Each leaf node of tree structure 112 is a terminal node and corresponds to one of two or more classes or categories (class label subgroups) that the classification model, once constructed, assigns a target input to in performing a model prediction. Members of a class label subgroup are those observations from a sample population that are assigned to a specific class or category. Each label of a class label subgroup indicates the class or category to which the subgroup corresponds.

Machine learning engine 116 builds tree structure 112 based on labeled training data 118 that is electronically stored in, and retrieved from, database 120. Labeled training data 118 comprises an N-member set $\{X_1, X_2, \ldots, X_N\}$ of input vectors, matrices, or higher-order tensors, each of which is assigned a corresponding class label $\{C_1, C_2, \ldots, C_N\}$ and whose elements are predictor indicators (values or ranges of values) of the predictors (e.g., features of a feature vector) based on which the classification model generates predictions. Each member of the N-member set $\{X_1, X_2, \ldots, X_N\}$ of labeled training data 118 is encoded for machine processing as a class record and assigned one of the corresponding class labels $\{C_1, C_2, \ldots, C_N\}$. Machine learning engine 116 can implement, for example, greedy optimization starting with the root node (comprising the entire N-member set, or the input space, of record labels) and successively adding branch-connected nodes. Each node corresponds to a predictor (e.g., blood pressure, age, income) that takes on a specified predictor indicator (e.g., blood pressure level high, age less than 50 years) that splits the class records into those in which the predictor takes on the specified predictor indicator (value or range of values) and those that do not. Those class records that do are marked as derived from, or corresponding to, a node associated with the specified predictor indicator. The specific class label assigned to a leaf node corresponds to which of the class labels $\{C_1, C_2, \ldots, C_N\}$ is assigned to the leaf node. The class label is assigned based on a dominant class label—that is, the class label of the greatest number of class records contained in the leaf node. The dominant class may be the only class represented by class records contained in a leaf node.

In creating successive nodes, machine learning engine 116 chooses which predictor to use for a split as well as a predictor indicator threshold of the split. Joint optimization of the choice of predictor and threshold (specific predictor indicator) can be done by exhaustive search, which can be repeated until an appropriate cost of misclassifications is minimized, information gain is maximized, or another appropriate measure is achieved. In some arrangements, a large tree is initially grown and then pruned according to a criterion that balances residual error against a measure of model complexity. In certain arrangements, machine learning engine 116 uses the C5.0 algorithm to build tree structure 112 by splitting the input space (class records comprising labeled training data 118) in a way that provides maximum information gain.

The classification model, once trained, performs a model prediction by assigning an input target record to a specific one of the class label subgroups. The prediction that the model makes can vary depending on the labeled training data used to construct the classification model represented by tree structure 112. For example, the model can be trained to predict the most efficacious drug for a specific patient given the patient's age, sex, blood pressure level, and/or one or more other predictors. The model can be trained, for example, to predict the likelihood that a borrower defaults on a loan given the borrower's income, education, marital status, and/or one or more other predictors.

At block 204, display engine 102 generates a first display of a representation of tree structure 112, the representation including the multiple class label subgroups and class-specific predictor indicators. The display engine 102 can generate the display within graphical user interface (GUI) 122, interacting with the computer hardware of the system in which system 100 is implemented. For example, GUI 122 can be provided by a display device such as display device 424 of computer system 412 (FIG. 4).

Referring specifically to FIG. 1B, the representation of tree structure 112 within GUI 122 illustratively includes root node 0, which connects via multiple paths through intermediate nodes 1 through 6 to leaf nodes 7 through 12. Each leaf node maps to a class label subgroup.

At block 206, a selection of a class label subgroup is received by display engine 102 and a selection of a class-specific predictor indicator is received by path traversal engine 104 and predictor indicator identifier 106. The selection of the class label subgroup is made from multiple class label subgroups displayed. The selection is made in response to user input 114 and received from GUI 122, in which the multiple class label subgroups mapped to the leaf nodes are displayed.

The selection of the class-specific predictor indicator is made in response to user input 124, which also can be received from GUI 122. The selected class-specific predictor indicator corresponds to a specific one of the class labels $\{C_1, C_2, \ldots, C_N\}$. The class-specific predictor indicator is selected from multiple class-specific predictor indicators corresponding to intermediate nodes 1 through 7 of tree structure 112. The selection can be made in response to user input 124 received, for example, from GUI 122 in which the multiple class-specific predictor indicators corresponding to the nodes are displayed.

At block 208, path traversal engine 104 traverses each path between the root node of tree structure 112 and each leaf node that maps to the specific class label subgroup selected in response to user input 114. If more than one leaf node corresponds to the class label subgroup selected, then path traversal engine 104 traverses each path between a leaf node corresponding to the class label subgroup and the root node.

At block 210, predictor indicator identifier 106 identifies each instance of the predictor indicator selected in response to user input 124. Each instance of the selected class-specific predictor indicator corresponds to a node along a path traversed by path traversal engine 104 and lies on a path extending between the root node of multi-nodal tree 112 and a leaf node mapped to the class label subgroup selected in response to user input 114. It is possible, however, that there is a path extending between the root node and a leaf node mapped to the selected class label subgroup on which no instance of the selected predictor lies.

At block 212, frequency determiner 108 determines a term predictor indicator frequency $TF_{pi}$ for an identified instance of the class-specific predictor indicator selected in response to user input 124. In general, the term predictor indicator frequency $TF_{pi}$ measures the strength of association or influence of a specific leaf node with respect to the entire class label subgroup mapped to the specific leaf node. Although not limited in this manner, one approach to determining the term predictor indicator frequency $TF_{pi}$ on a traversed path involves frequency determiner 108 performing a data count of the number of record labels $n_l$ contained in the traversed path's leaf node and a data count of the total number of record labels $n_c$ that correspond to the class label subgroup selected in response to user input 114. The term predictor indicator frequency $TF_{pi}$ is then determined by frequency determiner 108 as the number of record labels $n_l$ relative to the total number of record labels $n_c$:

$$TF_{pi} = \frac{n_l}{n_c}.$$

If, on any path traversed by path traversal engine 104 at block 204, there is no predictor indicator of the predictor selected in response to user input 124, then $TF_{pi}$ is zero. Because the greatest number of class records in a leaf node are those of the specific class assigned to the leaf node, there may be no significant difference between computing $n_l$ as the number of record labels of the class assigned to the leaf node or simply the total number of class records contained in the leaf node. That is, the number of class records other than those of the dominant class is zero or much less than the number of class records of the dominant class, namely, the class assigned to the leaf node.

At block 214, frequency determiner 108 determines a purity predictor indicator frequency $PF_{pi}$ for the identified instance of the class-specific predictor indicator. In general, the purity predictor indicator frequency $PF_{pi}$ measures the strength of association or influence of a specific leaf node with respect to all other leaf nodes corresponding to or derived from a node containing the class-specific predictor indicator. Although not limited in this manner, one approach to determining the purity predictor indicator frequency $PF_{pi}$ involves frequency determiner 108 performing a data count of the number of record labels $n_{pi}$ contained in a node corresponding to an instance of the predictor indicator and lying on a path between the root node and a leaf node corresponding to the class label subgroup. Note that, with this approach, $n_{pi}$ is thus the number of record labels having a predictor whose predictor indicator splits or separates the record labels contained in the node from other record labels. The purity predictor indicator frequency, $PF_{pi}$ is then determined by frequency determiner 108 as the number of record labels $n_l$ relative to the number of record labels $n_{pi}$:

$$PF_{pi} = \frac{n_l}{n_{pi}}.$$

Given that there may be more than one leaf node corresponding to the class label subgroup selected in response to user input 114, frequency determiner 108 determines at block 216 whether another instance of the selected class-specific predictor indictor lies on another path extending between the root node and a leaf node corresponding to the selected class label subgroup. Frequency determiner 108 determines a term predictor indicator frequency $TF_{pi}$ and a purity predictor indicator frequency $PF_{Pi}$ for each instance of the class-specific predictor indicator on a path traversed by path traversal engine 104 at block 204. For each instance of the class-specific predictor indicator, frequency determiner 108 determines the value $TF_{pi}*PF_{pi}$. If there is no instance of the class-specific predictor indicator on any one of the traversed paths, then the value $TF_{pi}*PF_{pi}$ is zero.

If at block 218, frequency determiner 108 determines that more than one instance of the class-specific predictor instances is identified, then predictor indicator importance generator 110 merges the value $TF_{pi}*PF_{pi}$ of each instance at block 220. A block 222, predictor indicator importance generator 110 generates the class-specific predictor importance $C_{Pi}$:

$$C_{pi} = \Sigma_{i=1}^{CL} TF_{pi}*PF_{pi},$$

where CL is the number of leaf nodes corresponding to the class label subgroup selected in response to user input 114 and pi is an instance of the class-specific predictor indicator selected in response to user input 124.

At block 224, display engine 102 generates a second display of a representation of tree structure 112. Each path extending between a root node of tree structure 112 and a leaf node mapped to the selected class label subgroup, and on which lies a node containing an instance of the selected class-specific predictor indicator, is depicted in the second display in a manner that contrasts with other paths extending between the root node and other leaf nodes of tree structure 112.

Referring specifically now to FIG. 1C, the second display is presented in GUI 122. As depicted, tree structure 112 illustratively includes root node 0, which connects via multiple paths through intermediate nodes 1 through 6 to leaf nodes 7 through 12. Each leaf node maps to a class label subgroup. Illustratively, node 8 and node 12 both map to the class label subgroup selected in response to user input 114. Node 3 illustratively corresponds to the class-specific predictor indictor selected in response to user input 124. Each path extending between root node 0 and mapped to the selected class label subgroup—illustratively nodes 8 and 12—on which lies a node containing an instance of the selected class-specific predictor indicator, is depicted in the second display in a manner that contrasts with each other path extending between the root node and other leaf nodes of the tree stricture. Although both node 8 and node 12 map to the selected class label subgroup, an instance of the selected class-specific predictor indicator (within node 3) lies only on path 126, which extends between root node 0 and leaf node 8 corresponding to the selected class label subgroup. The path extending between root node 0 and leaf node 8 is highlighted in contrast with the other paths between root node 0 and other leaf nodes of tree structure 112. Illustratively, display engine 102 contrasts the path extending between root node 0 and leaf node 8 on which node 3 corresponding to the selected class-specific predictor indicator lies from other paths by highlighting the path between root node 0 and leaf node 8. In other arrangements the path between root node 0 and leaf node 8 can be displayed in a color different from a color of the other paths of tree structure 112, or with a different line weight, or other difference such as the structure of the branches to contrast the path with the other paths between root node 0 and the other leaf nodes.

Although, as illustrated in FIG. 1C, an instance of the selected class-specific predictor indicator occurs on only one path between the root node and leaf nodes mapped to the selected class label subgroup, in other applications an instance of the selected class-specific predictor indicator can occur at nodes on more than one path. In general, if the selected class label subgroup maps to more than one leaf node, then an instance of the class-specific predictor indicator can occur at a node on one path, all paths, or only some paths extending between the root node and the leaf nodes mapped to the selected class label subgroup. This illustrated below.

Referring additionally now to FIGS. 3A-3D, an example application of certain aspects of system 100 are illustrated in which tree structure 300 corresponds to a classification model trained using machine learning (e.g., C5.0 algorithm) to predict which of five drugs (A, B, C, X, or Y) is most effective in treating a patient exhibiting certain physical characteristics. The physical characteristics are the patient's blood levels of sodium Na and potassium K measured in millimoles per liter (mmol/l) using SI units, blood pressure (PB) (HIGH, LOW, or NORMAL), cholesterol (HIGH or NORMAL) LOW, or NORMAL), sex (M or F), and age (years). The training data and target inputs are encoded as six-dimensional feature vectors $x=(x_1, x_2, \ldots, x_6)^T$, the elements of which correspond to the enumerated physical characteristics. Each physical characteristic serves as a predictor K, NA, BP, cholesterol, sex, or age. Predictors K, NA, and age are continuous predictors. The predictor BP is an ordinal predictor, and the predictor sex is a nominal predictor. The tree structure 300 is constructed from a sample population of 200 observations. Each feature vector representing a patient observation is encoded as a record label and assigned a class label "drugA," "drugB," "drugC," "drugX," or "drugY" according to which drug proved most successful at treating the patient. The class labels designate the class subgroups of the sample population.

Figure 3A:
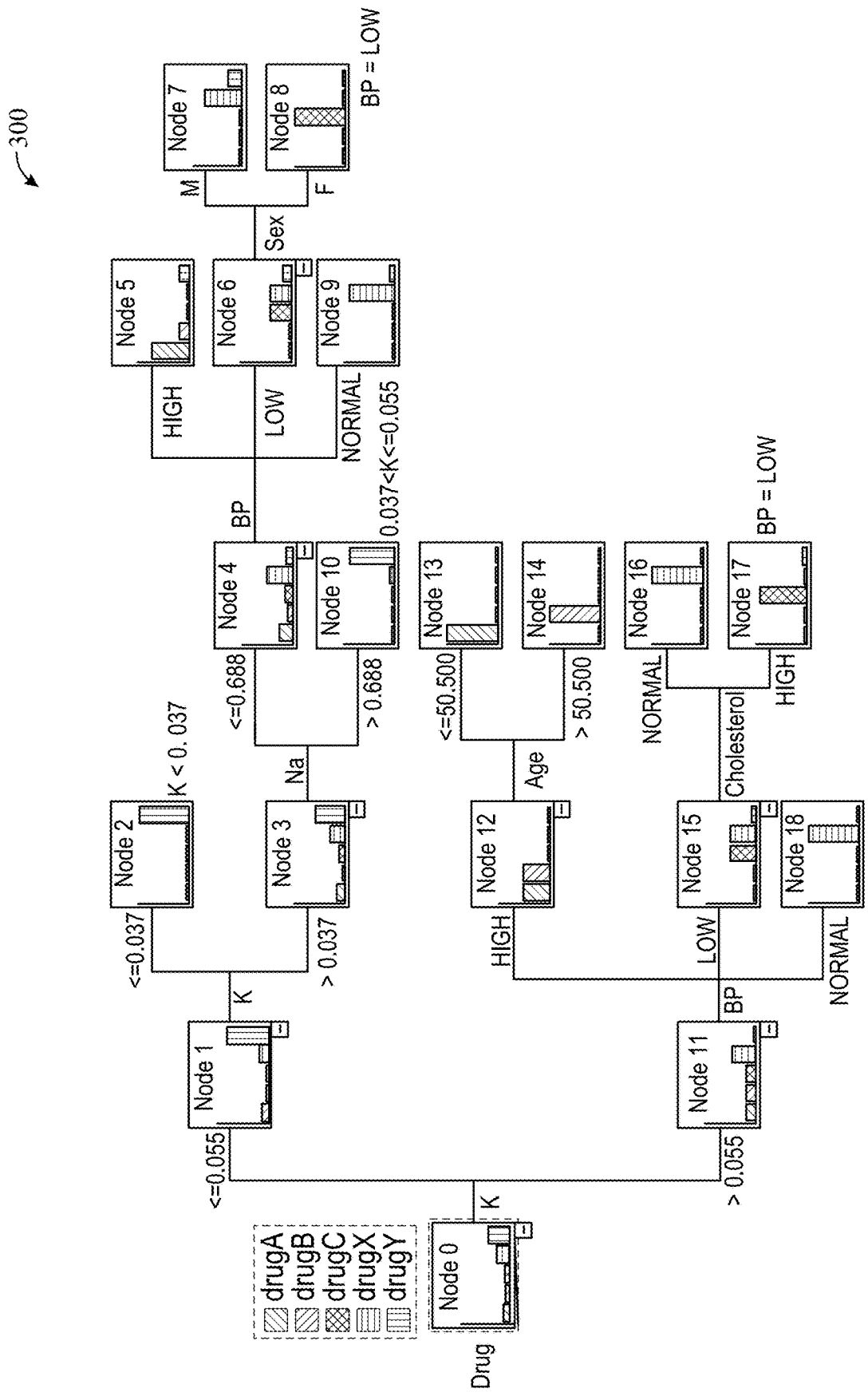
FIGS. 3A-3D illustrate certain operative aspects of the system of FIG. 1.
Figure 3B:
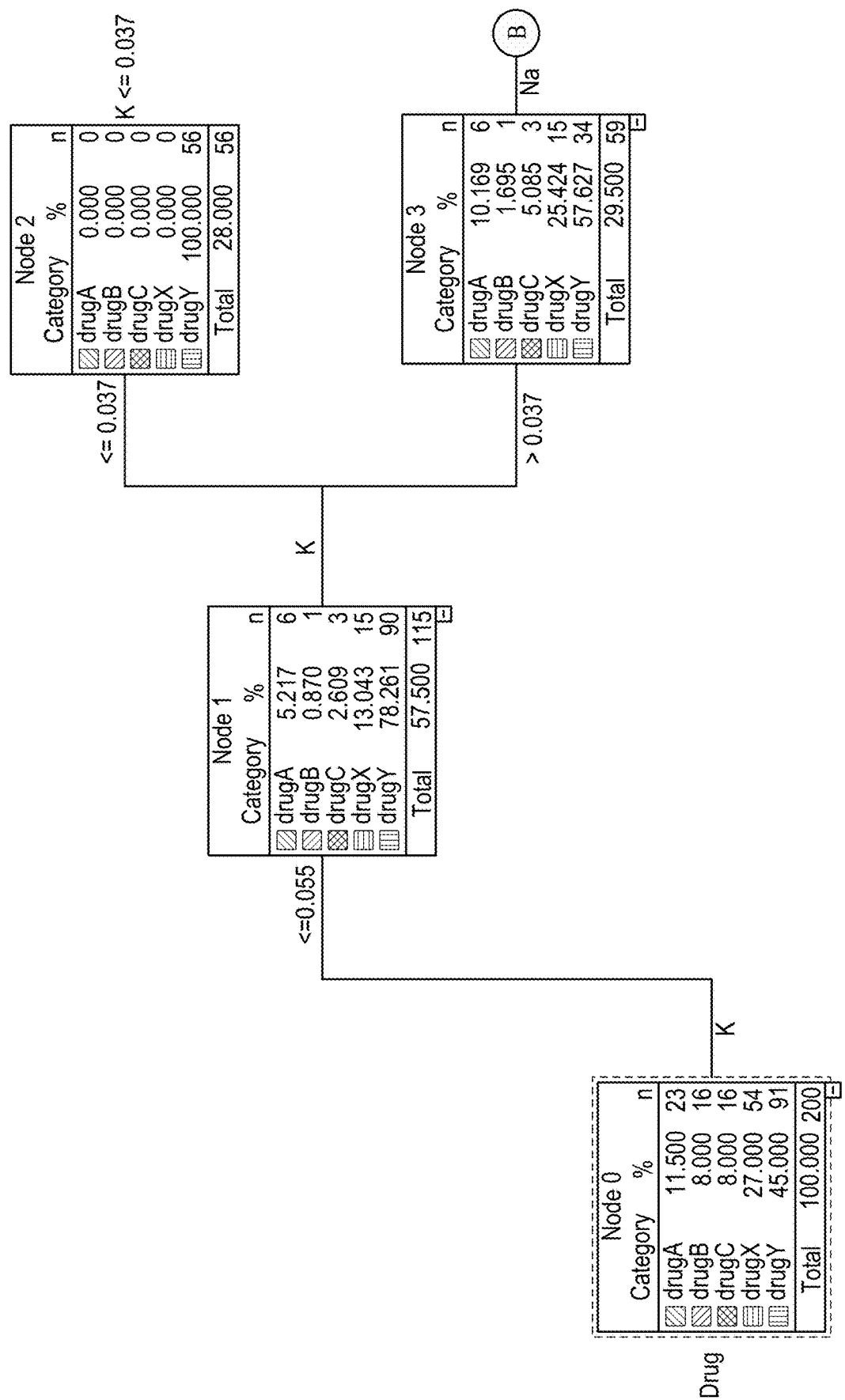
Figure 3C:
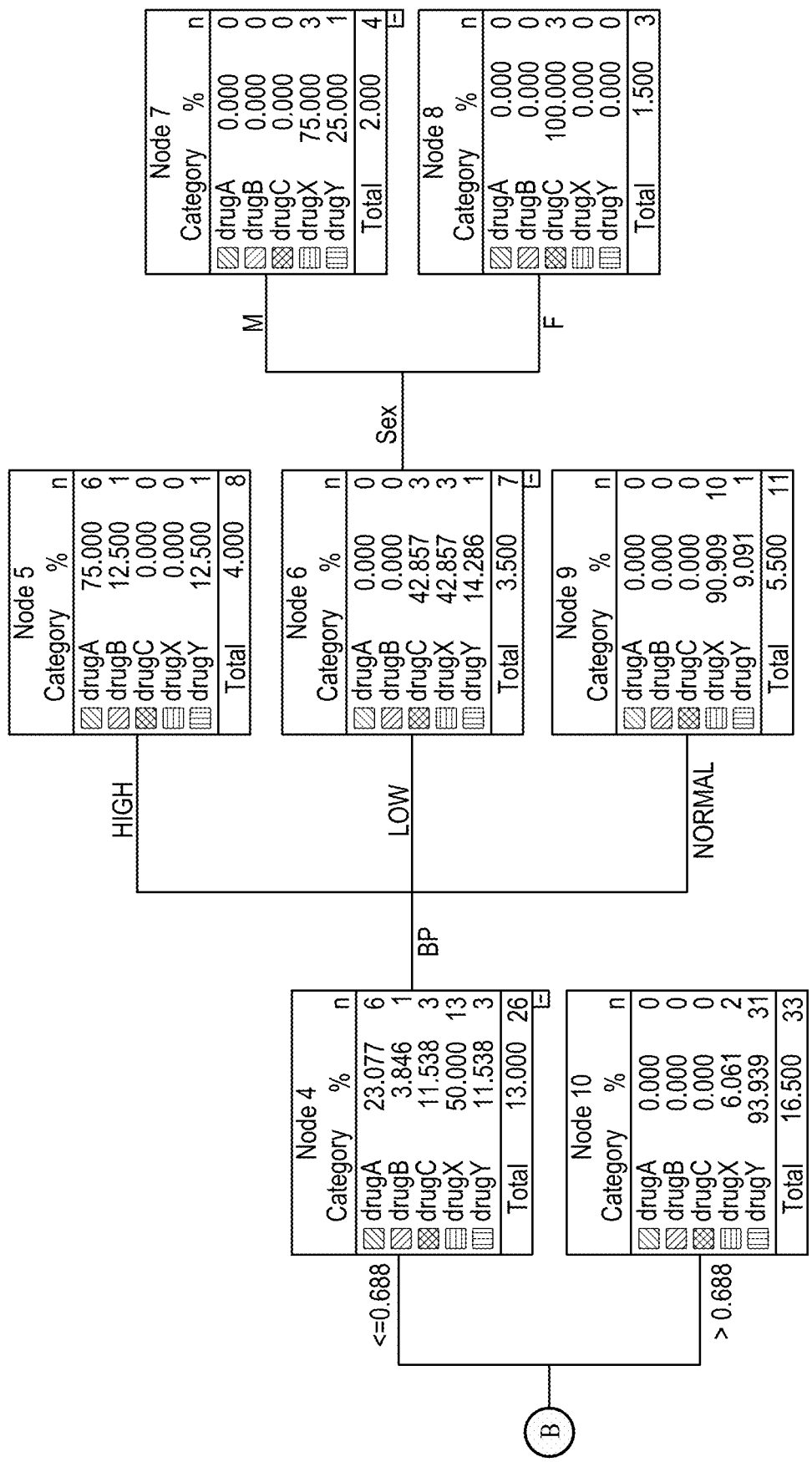
Figure 3D:
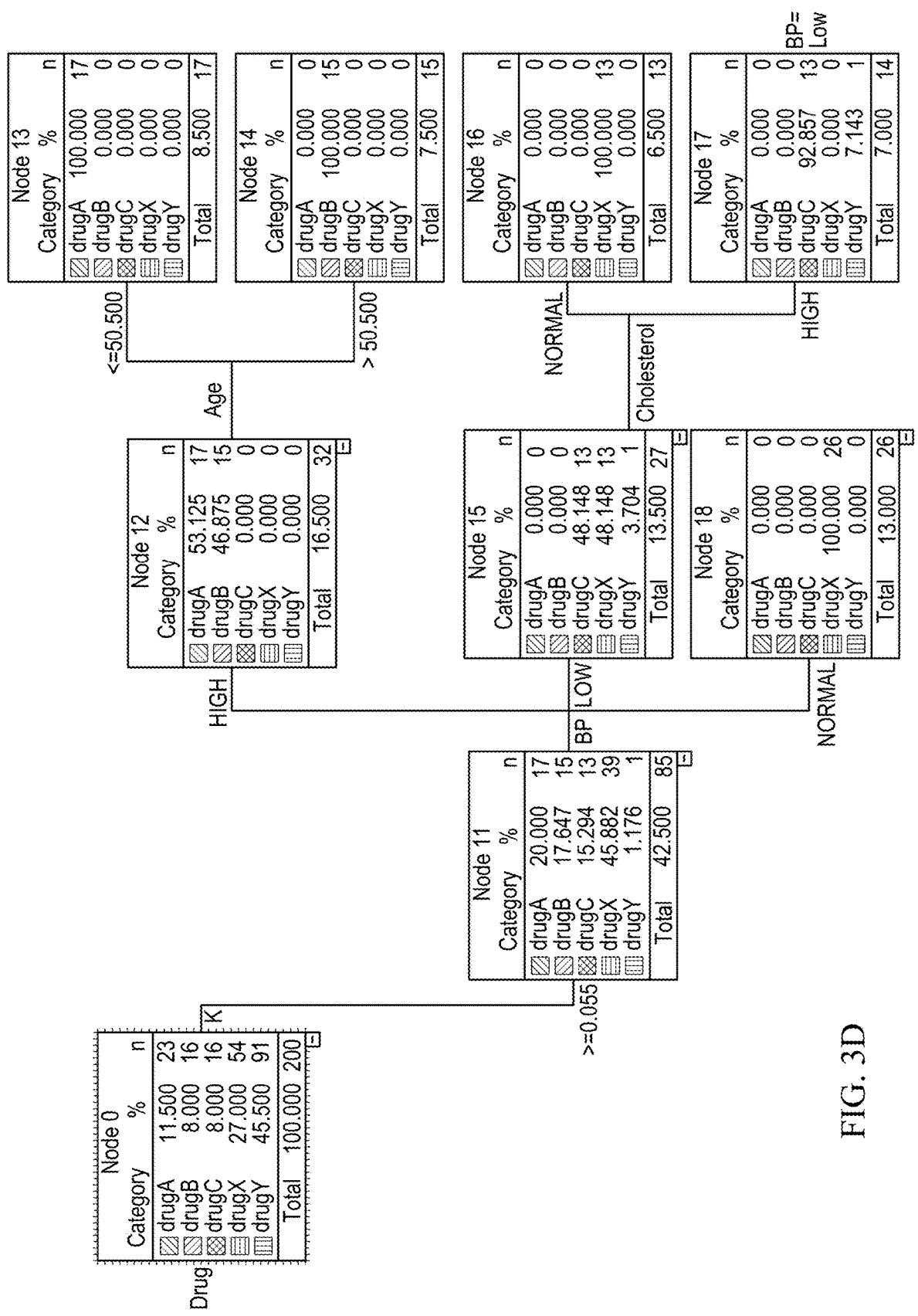

Tree structure 300 is constructed by machine learning engine 116's successively splitting the record labels into distinct nodes based on predictor indicators (values or ranges of values) of the predictors (K, NA, BP, cholesterol, sex, and age). Referring particularly to FIG. 3A, an initial split generates nodes 1 and 11, based on whether the predictor indicator of predictor K (level of potassium) of a record label is equal to or greater than 0.055 mmol/l or is less than 0.055 mmol/l. The predictor indicator of predictor K is continuous and, accordingly, can be cascaded, as it is in splitting node 1 into nodes 2 and 3. Referring additionally to FIGS. 3B, 3C and 3D, nodes 2 and 3, respectfully, further split the record labels into those in which the predictor indicator of predictor K is less than or equal to 0.037 mmol/l and those in which the predictor indicator is greater than 0.037 mmol/l but less than or equal to 0.055 mmol/l.

Referring still to FIGS. 3A, 3B, and 3C, the subsequent split at node 3 splits the record labels based on the predictor indicators of predictor Na, generating nodes 4 and 10. At node 4, the record labels are split based the predictor indicators of predictor BP, generating nodes 5, 6, and 9 corresponding, respectively, to record labels having BP predictor indicators HIGH, LOW, and NORMAL. Nodes 7 and 8 follow from spitting the record labels at node 6 according to the corresponding predictor indicator, M or F, of each the record label. Nodes 7 and 8 are leaf nods. Referring particularly now to FIGS. 3A and 3D, record labels at node 11 created from the initial split are further split based on each record label's BP predictor indicator, generating nodes 12, 15, and 19. The record labels at node 12 are further split according to whether the predictor indicator of the record labels' age predictor is less than or equal to 50 years or is greater than 50 years, generating nodes 13 and 14. Nodes 13 and 14 are leaf nodes. The record labels at node 15 are further split according to whether the predictor indicator of the record labels' cholesterol predictor is NORMAL or HIGH, generating respectively nodes 16 and node 17. Nodes 16 and 17 are leaf nodes.

Each of tree structure 300's leaf nodes—terminal nodes 7, 8, 13, 14, 16, and 17—indicates a prediction, as there is a dominant class label at each of the leaf nodes as indicated by the larger number of record labels of one class relative to those of the other classes contained in each. A target input (patient) whose predictor indicators (K, Na, BP, cholesterol, sex, and age) place the target in node 7 is most likely treatable successfully with drug X, as 3 out of 4 sample record labels (75%) were thus labeled. The prediction for a target input whose predictors correspond to sample record labels at node 8 or node 17 is drug C. If placed at node 13, drug A is the prediction. If placed at node 14, the prediction is drug B. And if placed at node 16, the prediction is drug X.

System 100 is capable of generating an output specifying a class-specific predictor indicator importance of each predictor relative to each class of tree structure 300. Moreover, system 100 is capable of generating an output specifying the importance of any predictor indicator (value or range of values) of a class-specific predictor. For example, system 100 can generate the class-specific predictor indicator importance of predictor BP=LOW with respect to the drug class C.

Display engine 102 initially maps leaf nodes 8 and 17—drug C being the dominant class for both nodes—to the class label subgroup corresponding to drug C (class label="drugC"). The mapping yields two distinct paths. One path extends from node 8 through nodes 6, 4, 3, and 1 to root node 0. The other path extends from node 17 through nodes 15 and 11 to root node 0.

Path traversal engine 104 traverses the path extending between leaf node 8 and root node 0 and the path extending between leaf node 17 and root node 0. In response to the user input specifying a predictor indicator, predictor indicator identifier 106 identifies each instance of the predictor indicator at a node on the paths at which the record labels were split based on the predictor indicator selected (LOW) for predictor BP. Along the path extending between leaf node 8 and root node 0, an instance of BP=LOW occurs at node 6, and accordingly, is identified by predictor indicator identifier 106. Along the path extending between leaf node 17 and root node 0, an instance of BP=LOW occurs at node 15, and accordingly, is also identified by predictor indicator identifier 106.

Frequency determiner 108 determines a term predictor indicator frequency, $TF_{pi}$, and a purity predictor indicator frequency, $PF_{pi}$, at node 6 on the path extending between leaf node 8 and root node 0. Frequency determiner 108 also determines a term predictor indicator frequency, $TF_{pi}$, and a purity predictor indicator frequency, $PF_{pi}$, at node 15 on the path extending between leaf node 17 and root node 0.

Predictor indicator importance generator 110 generates a class-specific predictor importance $C_{pi}$ for the predictor BP=LOW based on merging of the term predictor indicator frequency, $TF_{pi}$, and purity predictor indicator frequency, $PF_{pi}$, determined at node 6 on the path extending between leaf node 8 and root node 0 and the term predictor indicator frequency, $TF_{pi}$, and purity predictor indicator frequency, $PF_{pi}$, at node 15 on the path extending between leaf node 17 and root node 0:

$$C_{pi} = \text{drugC}(BP=LOW) = \sum_{i=1}^{CL=2} TF_{pi} * PF_{pi} = TF_{p1} * PF_{p1} + TF_{p2} * PF_{p2} = (3/16)*(3/7)+(13/16)*(13/27) = 0.427 + 0.076 = 0.503.$$

Executing the same functions, system 100 can determine a class-specific predictor indicator importance for other predictor indicators of other predictors. For example, the class-specific predictor indicator drugC ($0.037 < K \leq 0.055$) for the specific class "drugC" and the predictor indicator of predictor K between 0.037 and 0.055 mmol/l is $$C_{pi} = \text{drugC}(0.037 < K \leq 0.055) = (13/16)*(3/59) = 0.009,$$

and for the specific class "drugC" and the predictor indicator K greater than 0.055 mmol/l is $$C_{pi} = \text{drugC}(0.037 < K \leq 0.055) = (13/16)*(13/8s) = 0.136.$$

A class-specific predictor importance can be determined by summing each of the class-specific predictor indicator importance values a predictor. For example, the class-specific predictor indicator of K with respect to the class "drugC" is 0.009+0.135=0.145. In the case of the predictor importance of the predictor blood pressure BP for class "drugC" the class-specific predictor importance is equal to the class-specific predictor indicator importance $C_{pi}$=drugC (BP=LOW) since drugC(BP=HIGH)=drugC (BP=NORMAL)=0.

Even when a predictive model and corresponding tree structure achieves an optimal level of predictive accuracy given the available training data, system 100 nevertheless improves the model by adding another dimension to the model. System 100 identifies and quantitatively measures the effect of predictor indicators (values and ranges of values) of predictors (feature vectors, matrices, or higher-order tensors) on distinct classes of a prediction model. The class-specific predictor indicator importance generated by system 100 measures a strength of association between a class-specific predictor indicator and a class-label subgroup. System 100 also can generate a class-specific predictor importance by summing every class-specific predictor indicator importance corresponding to a predictor. Providing a quantitative measure of the class-specific importance of predictors and predictor indicators enhances both the predictive and inferential capabilities of a machine learning model, as well as model interpretability.

In the context of medical diagnostics, for example, system 100 can enhance a prediction model by identifying and quantifying the strength of different predictor indicators in predicting the type of disease afflicting a patient. Based on a system-generated predictor indicator importance can alert a physician of the specific disease out of multiple possible diseases when treating a patient that exhibits high blood pressure or is over 50. As demonstrated above in predicting drug efficacy, system 100 identifies and quantifies the importance of class-specific predictor indicators in identifying individual drugs. The system-generated predictor indicator importance reveals the most significant predictor indicator with respect to drug C is low blood pressure. The information can improve diagnostics, as well as direct future medical research efforts, for example, with respect to identifying drugs that are most effective in treating individuals having low blood pressure. In the context of business analytics, for example, system 100 can identify and quantify the strength of predictor indicators in targeting advertising campaigns. A system-generated predictor indicator importance can reveal to a marketing team which advertising is most likely to appeal to customers having at least a college degree or a certain level of income.

In some arrangements, system 100 maps every leaf node of a tree structure to a class label subgroup. With respect to each class label subgroup, system 100 determines a distinct class-specific predictor indicator importance for a user-selected predictor indicator. Based on the distinct class-specific predictor indicator importance of each class label subgroup, system 100 can make a quantitative comparison to determine which of the class label subgroups are strongly influenced (e.g., class-specific predictor indicator importance greater than a predetermined threshold) by the predictor indicator and which are only weakly influenced, if at all, by the predictor indicator. For example, low blood pressure (BP=LOW) may be a strong influence with respect to one drug in the sense that a target input is likely classified or categorized as treatable with the drug and yet be a weak influence with respect to one or more of the other drugs.

In other arrangements, system 100 can determine for any predictor of the prediction model a predictor importance. A predictor's predictor importance can be determined by summing each class-specific predictor indicator associated with the predictor across all class label subgroups of the prediction model. In certain arrangements, system 100 computes a predictor importance of each predictor of the prediction model. System 100 can normalize each predictor importance and rank each relative to the other predictors based on the predictor importance of each.

Implemented in a computer system having a display device, as described above, system 100 can cause the display device to present a tree structure in a manner that visually contrasts each path between a root node of the tree structure and a leaf node mapped to the selected class label subgroup, and on which lies a node containing an instance of the selected class-specific predictor indicator with other paths between the root node and other leaf nodes of the tree structure. For example, system 100 can cause the display device to present the tree structure in a manner such that each path between a root node of the tree structure and a leaf node mapped to the selected class label subgroup, and on which lies a node containing an instance of the selected class-specific predictor indicator, is highlighted (FIG. 1C), displayed in a color different from the color of the other paths, or displayed with a line weight or branch structure different from that of the other paths.

With this feature, a user can visually identify and select a specific leaf node. System 100 can respond by visually contrasting each path from the root node to each leaf node mapped to the same class label subgroup as that of the selected leaf node if there is more than one. This manner of displaying the paths enables the user to readily identify the predictor indicators at corresponding nodes on each of the paths. The user can select a predictor indicator on one or more of the paths with a keyboard or mouse pointer or similar tool. System 100, in response, can identify and traverse all paths between a leaf node of the same class as the leaf node selected and can initiate the generation of a class-specific predictor indicator importance for the user-selected predictor indicator.

Aspects of the inventive arrangements disclosed herein have been described primarily in the context of a classification model generated with machine learning. It will be readily apparent to one of ordinary skill in the art, however, that the inventive arrangements disclosed can also apply with respect to other models, such as tree-based regression models trained using training data comprising vectors, matrices, or higher-order tensors $\{X_1, X_2, \ldots, X_N\}$ with corresponding continuous labels $\{t_1, t_2, \ldots, t_N\}$. Moreover, the inventive arrangements can be used with multiple tree-based models, such as random forests and other multiple tree-based models.

FIG. 4 illustrates a schematic of an example of a computing node 400 used in implementing system 100. In one or more embodiments, computing node 400 is an example of a suitable cloud computing node. Computing node 400 is not intended to suggest any limitation as to the scope of use or functionality of embodiments of the invention described herein. Computing node 400 is capable of performing any of the functionality described within this disclosure.

Computing node 400 includes a computer system 412, which is operational with numerous other general-purpose or special-purpose computing system environments or configurations. Examples of well-known computing systems, environments, and/or configurations that may be suitable for use with computer system 412 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 412 may be described in the general context of computer system-executable instructions, such as program modules, being executed by a computer system. Generally, program modules may include routines, programs, objects, components, logic, data structures, and so on that perform particular tasks or implement particular abstract data types. Computer system 412 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 4, computer system 412 is shown in the form of a general-purpose computing device. The components of computer system 412 may include, but are not limited to, one or more processors 416, a memory 428, and a bus 418 that couples various system components including memory 428 to processor 416. As defined herein, "processor" means at least one hardware circuit configured to carry out instructions. The hardware circuit may be an integrated circuit. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

The carrying out of instructions of a computer program by a processor comprises executing or running the program. As defined herein, "run" and "execute" comprise a series of actions or events performed by the processor in accordance with one or more machine-readable instructions. "Running" and "executing," as defined herein refer to the active performing of actions or events by the processor. The terms run, running, execute, and executing are used synonymously herein.

Bus 418 represents one or more of any of several types of bus structures, including a memory bus or memory controller, a peripheral bus, an accelerated graphics port, and a processor or local bus using any of a variety of bus architectures. By way of example only, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus, and PCI Express (PCIe) bus.

Computer system 412 typically includes a variety of computer system-readable media. Such media may be any available media that is accessible by computer system 412, and may include both volatile and non-volatile media, removable and non-removable media.

Memory 428 may include computer system readable media in the form of volatile memory, such as random-access memory (RAM) 430 and/or cache memory 432. Computer system 412 may further include other removable/non-removable, volatile/non-volatile computer system storage media. By way of example, storage system 434 can be provided for reading from and writing to a non-removable, non-volatile magnetic media and/or solid-state drive(s) (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 418 by one or more data media interfaces. As will be further depicted and described below, memory 428 may include at least one program product having a set (e.g., at least one) of program modules that are configured to carry out the functions of embodiments of the invention.

Program/utility 440, having a set (at least one) of program modules 442, may be stored in memory 428 by way of example, and not limitation, as well as an operating system, one or more application programs, other program modules, and program data. Each of the operating system, one or more application programs, other program modules, and program data or some combination thereof, may include an implementation of a networking environment. Program modules 442 generally carry out the functions and/or methodologies of embodiments of the invention as described herein. For example, one or more of the program modules may include a class-specific predictor importance determining system, such as system 100, or portions thereof.

Program/utility 440 is executable by processor 416. Program/utility 440 and any data items used, generated, and/or operated upon by computer system 412 are functional data structures that impart functionality when employed by computer system 412. As defined within this disclosure, a "data structure" is a physical implementation of a data model's organization of data within a physical memory. As such, a data structure is formed of specific electrical or magnetic structural elements in a memory. A data structure imposes physical organization on the data stored in the memory as used by an application program executed using a processor.

Computer system 412 may also communicate with one or more external devices 414 such as a keyboard, a pointing device, display device 424, etc.; one or more devices that enable a user to interact with computer system 412; and/or any devices (e.g., network card, modem, etc.) that enable computer system 412 to communicate with one or more other computing devices. Such communication can occur via input/output (I/O) interfaces 422. Still, computer system 412 can communicate with one or more networks such as a local area network (LAN), a general wide area network (WAN), and/or a public network (e.g., the Internet) via network adapter 420. As depicted, network adapter 420 communicates with the other components of computer system 412 via bus 418. It should be understood that although not shown, other hardware and/or software components could be used in conjunction with computer system 412. Examples, include, but are not limited to: microcode, device drivers, redundant processing units, external disk drive arrays, RAID systems, tape drives, and data archival storage systems, etc.

While computing node 400 is used to illustrate an example of a cloud computing node, it should be appreciated that a computer system using an architecture the same as or similar to that described in connection with FIG. 4 may be used in a non-cloud computing implementation to perform the various operations described herein. In this regard, the example embodiments described herein are not intended to be limited to a cloud computing environment. Computing node 400 is an example of a data processing system. As defined herein, "data processing system" means one or more hardware systems configured to process data, each hardware system including at least one processor programmed to initiate operations and memory.

Computing node 400 is an example of computer hardware. Computing node 400 may include fewer components than shown or additional components not illustrated in FIG. 4 depending upon the particular type of device and/or system that is implemented. The particular operating system and/or application(s) included may vary according to device and/or system type as may the types of I/O devices included. Further, one or more of the illustrative components may be incorporated into, or otherwise form a portion of, another component. For example, a processor may include at least some memory.

Computing node 400 is also an example of a server. As defined herein, "server" means a data processing system configured to share services with one or more other data processing systems. As defined herein, "client device" means a data processing system that requests shared services from a server, and with which a user directly interacts. Examples of a client device include, but are not limited to, a workstation, a desktop computer, a computer terminal, a mobile computer, a laptop computer, a netbook computer, a tablet computer, a smart phone, a personal digital assistant, a smart watch, smart glasses, a gaming device, a set-top box, a smart television and the like. In one or more embodiments, the various user devices described herein may be client devices. Network infrastructure, such as routers, firewalls, switches, access points and the like, are not client devices as the term "client device" is defined herein.

It is expressly noted that although this disclosure includes a detailed description on cloud computing, implementations of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
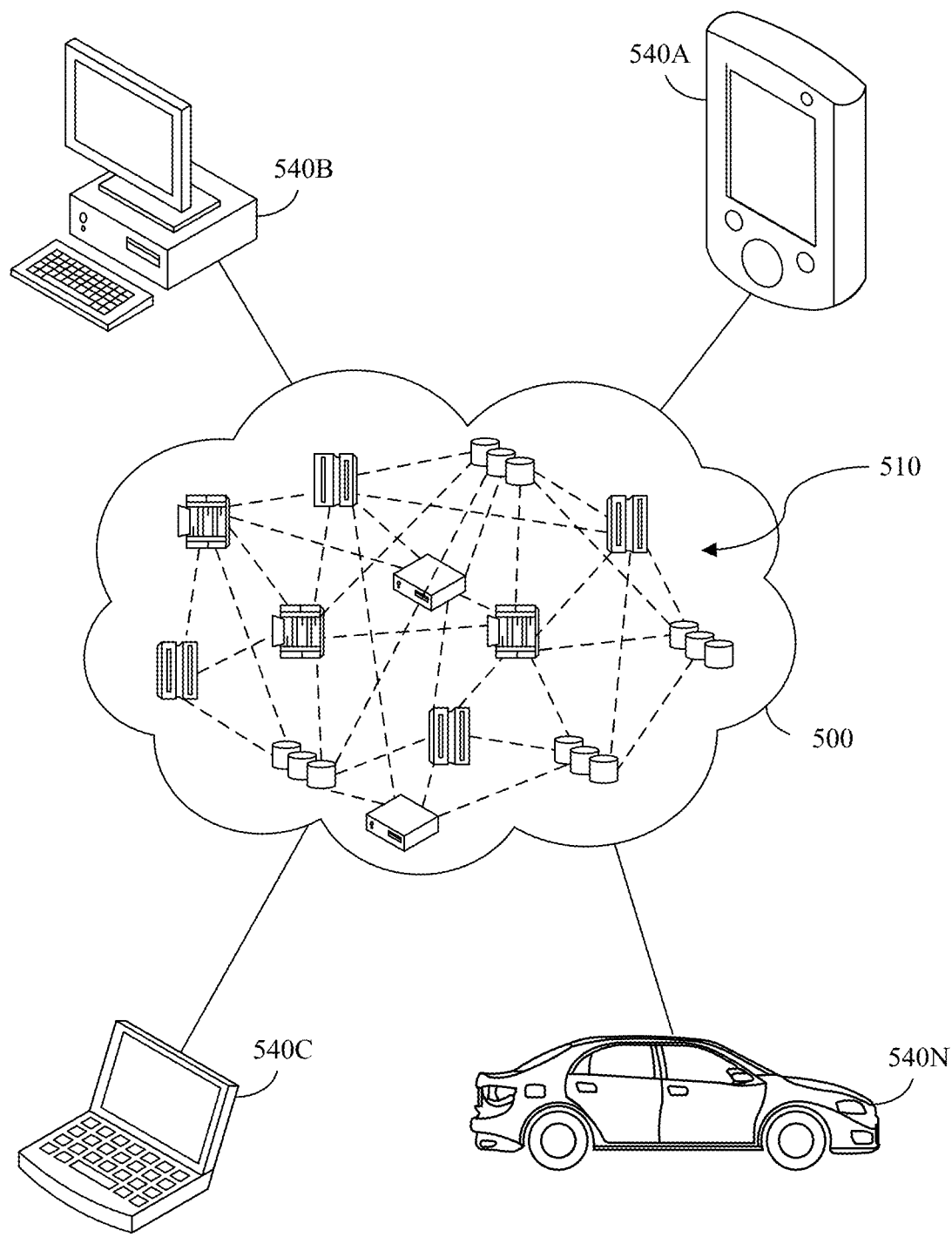
FIG. 5 illustrates a cloud computing environment.

Referring now to FIG. 5, illustrative cloud computing environment 500 is depicted. As shown, cloud computing environment 500 includes one or more cloud computing nodes 510 with which local computing devices used by cloud consumers, such as, for example, personal digital assistant (PDA) or cellular telephone 540a, desktop computer 540b, laptop computer 540c, and/or automobile computer system 540n may communicate. Computing nodes 510 may communicate with one another. They may be grouped (not shown) physically or virtually, in one or more networks, such as Private, Community, Public, or Hybrid clouds as described hereinabove, or a combination thereof. This allows cloud computing environment 500 to offer infrastructure, platforms and/or software as services for which a cloud consumer does not need to maintain resources on a local computing device. It is understood that the types of computing devices 540a-n shown in FIG. 5 are intended to be illustrative only and that computing nodes 510 and cloud computing environment 500 can communicate with any type of computerized device over any type of network and/or network addressable connection (e.g., using a web browser).

Figure 6:
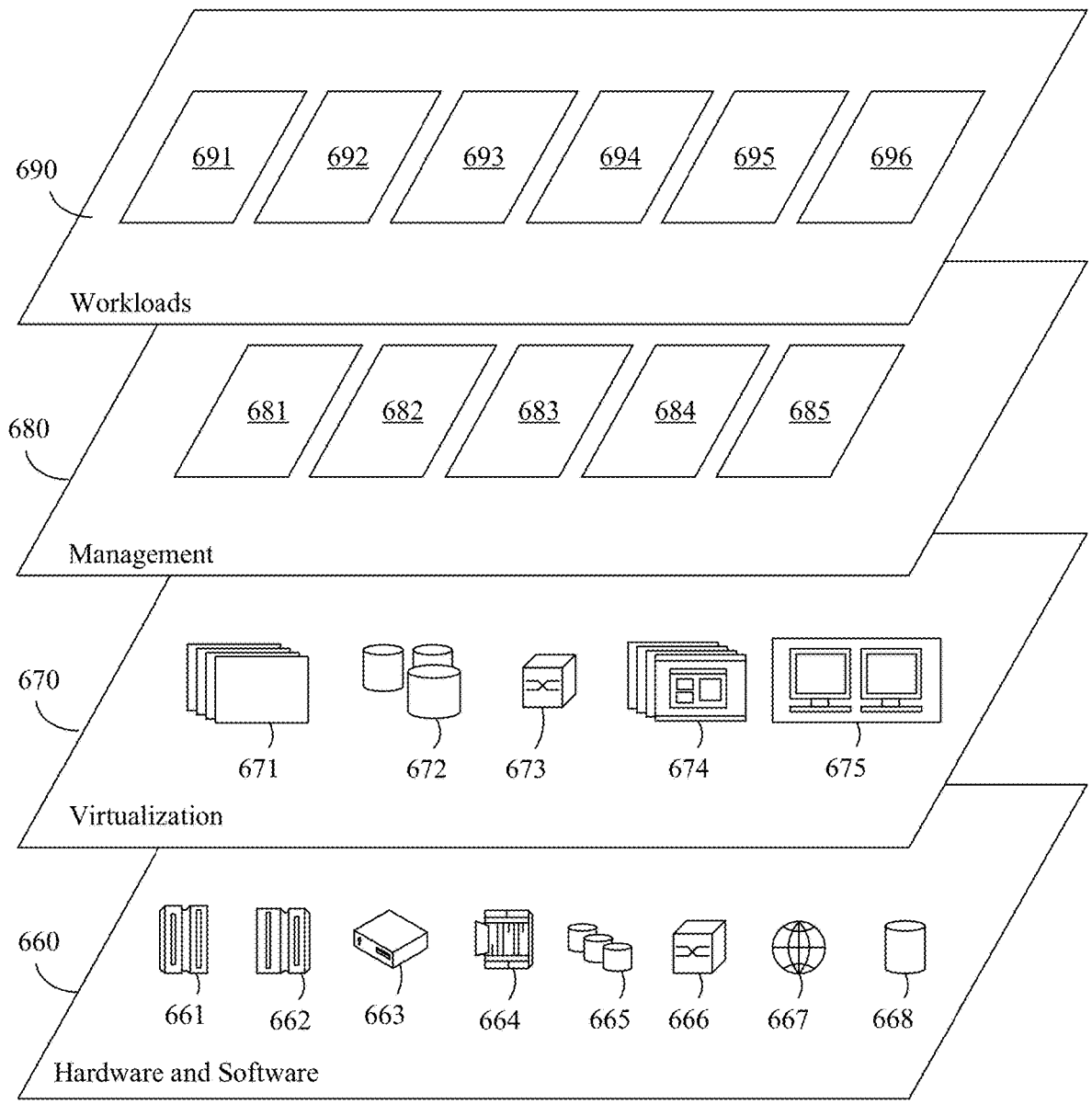
FIG. 6 illustrates example abstraction model layers of the cloud computing environment of FIG. 5.

Referring now to FIG. 6, a set of functional abstraction layers provided by cloud computing environment 500 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 660 includes hardware and software components. Examples of hardware components include mainframes 661; RISC (Reduced Instruction Set Computer) architecture-based servers 662; servers 663; blade servers 664; storage devices 665; and networks and networking components 666. In some embodiments, software components include network application server software 667 and database software 668.

Virtualization layer 670 provides an abstraction layer from which the following examples of virtual entities may be provided: virtual servers 671; virtual storage 672; virtual networks 673, including virtual private networks; virtual applications and operating systems 674; and virtual clients 675.

In one example, management layer 680 may provide the functions described below. Resource provisioning 681 provides dynamic procurement of computing resources and other resources that are utilized to perform tasks within the cloud computing environment. Metering and Pricing 682 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 683 provides access to the cloud computing environment for consumers and system administrators. Service level management 684 provides cloud computing resource allocation and management such that required service levels are met. Service Level Agreement (SLA) planning and fulfillment 685 provide pre-arrangement for, and procurement of, cloud computing resources for which a future requirement is anticipated in accordance with an SLA.

Workloads layer 690 provides examples of functionality for which the cloud computing environment may be utilized. Examples of workloads and functions which may be provided from this layer include: mapping and navigation 691; software development and lifecycle management 692; virtual classroom education delivery 693; data analytics processing 694; transaction processing 695; and class-specific predictor importance determining system 696.

The terminology used herein is for the purpose of describing particular embodiments only and is not intended to be limiting. Notwithstanding, several definitions that apply throughout this document now will be presented.

As defined herein, the singular forms "a," "an," and "the" include the plural forms as well, unless the context clearly indicates otherwise.

As defined herein, "another" means at least a second or more.

As defined herein, "at least one," "one or more," and "and/or," are open-ended expressions that are both conjunctive and disjunctive in operation unless explicitly stated otherwise. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, "automatically" means without user intervention.

As defined herein, "includes," "including," "comprises," and/or "comprising," specify the presence of stated features, integers, steps, operations, elements, and/or components, but do not preclude the presence or addition of one or more other features, integers, steps, operations, elements, components, and/or groups thereof.

As defined herein, "if" means "in response to" or "responsive to," depending upon the context. Thus, the phrase "if it is determined" may be construed to mean "in response to determining" or "responsive to determining" depending on the context. Likewise the phrase "if [a stated condition or event] is detected" may be construed to mean "upon detecting [the stated condition or event]" or "in response to detecting [the stated condition or event]" or "responsive to detecting [the stated condition or event]" depending on the context.

As defined herein, "one embodiment," "an embodiment," "in one or more embodiments," "in particular embodiments," or similar language mean that a particular feature, structure, or characteristic described in connection with the embodiment is included in at least one embodiment described within this disclosure. Thus, appearances of the aforementioned phrases and/or similar language throughout this disclosure may, but do not necessarily, all refer to the same embodiment.

As defined herein, the phrases "in response to" and "responsive to" mean responding or reacting readily to an action or event. Thus, if a second action is performed "in response to" or "responsive to" a first action, there is a causal relationship between an occurrence of the first action and an occurrence of the second action. The phrases "in response to" and "responsive to" indicate the causal relationship.

As defined herein, "real time" means a level of processing responsiveness that a user or system senses as sufficiently immediate for a particular process or determination to be made, or that enables the processor to keep up with some external process.

As defined herein, "substantially" means that the recited characteristic, parameter, or value need not be achieved exactly, but that deviations or variations, including for example, tolerances, measurement error, measurement accuracy limitations, and other factors known to those of skill in the art, may occur in amounts that do not preclude the effect the characteristic was intended to provide.

As defined herein, "user" can refer to an organization as well as an individual human being. "Enterprise" refers to an example organization of multiple individuals.

The terms first, second, etc. may be used herein to describe various elements. These elements should not be limited by these terms, as these terms are only used to distinguish one element from another unless stated otherwise or the context clearly indicates otherwise.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration and are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method within a computer hardware system including a machine learning engine and a predictor indicator importance generator, comprising:
    generating, using the machine learning engine, a prediction model having
      a tree structure including a plurality of nodes,
      a plurality of class label subgroups, and
      a plurality of class-specific predictor indicators;
    causing a first display, in a graphical user interface interacting with the computer hardware system, of a representation of the tree structure including the plurality of class label subgroups and the plurality of class-specific predictor indicators;
    receiving, based upon a user input, a selected class label subgroup from the displayed plurality of class label subgroups and a selected class-specific predictor indicator from the displayed plurality of class-specific predictor indicators;
    generating, using the predictor indicator importance generator, a class-specific predictor indicator importance for the selected class-specific predictor indicator by merging a term predictor indicator frequency and a purity predictor indicator frequency at each instance of the selected class-specific predictor indicator within one or more nodes of the tree structure; and
    causing a second display, in the graphical user interface, of the representation of the tree structure, wherein each path between a root node of the tree structure and a leaf node mapped to the selected class label subgroup having a node containing an instance of the selected class-specific predictor indicator is depicted in a manner that contrasts with other paths between the root node and other leaf nodes of the tree structure.

2. The computer-implemented method of claim 1, wherein
    the determining the purity predictor indicator frequency at an instance of the selected class-specific predictor indicator comprises determining all class records contained in one of one or more leaf nodes mapped to the selected class label subgroup and all class records corresponding to the selected class label subgroup contained in a node corresponding to the class-specific predictor indicator on a path between the one of one or more leaf nodes and the root node.

3. The computer-implemented method of claim 1, wherein
    the determining the term predictor indicator frequency at an instance of the selected class-specific predictor indicator comprises determining all class records corresponding to the selected class label subgroup that are contained in one of one or more leaf nodes mapped to the selected class label subgroup and all class records corresponding to the selected class label subgroup.

4. The computer-implemented method of claim 1, wherein
    the determining the term predictor indicator frequency at an instance of the selected class-specific predictor indicator comprises determining all class records contained in one of one or more leaf nodes mapped to the selected class label subgroup and all class records corresponding to the class label subgroup.

5. The computer-implemented method of claim 1, wherein
    the representation of the tree structure in the second display depicts each path between a root node of the tree structure and a leaf node mapped to the selected class label subgroup having a node containing an instance of the selected class-specific predictor indicator as highlighted, in a color different from a color of the other paths, or as having a line weight or branch structure different from that of the other paths.

6. The computer-implemented method of claim 1, wherein
    the prediction model having the tree structure is generated using a C5.0 machine learning algorithm.

7. The computer-implemented method of claim 1, wherein
    the selected class label subgroup comprises the plurality of class label subgroups; and
    the generating a class-specific predictor indicator importance comprises generating a distinct class-specific predictor indicator importance for each of the plurality of class label subgroups.

8. The computer-implemented method of claim 1, further comprising:
    determining a class-specific predictor importance of a predictor of the predictor model based on at least one class-specific predictor importance corresponding to the predictor.

9. A system, comprising:
    a processor configured to initiate operations including:
      generating a prediction model having
        a tree structure including a plurality of nodes,
        a plurality of class label subgroups, and
        a plurality of class-specific: predictor indicators;
      causing a first display, in a graphical user interface interacting with the system, of a representation of the tree structure including the plurality of class label subgroups and the plurality of class-specific predictor indicators;

receiving, based upon a user input, a selected class label subgroup from the displayed plurality of class label subgroups and a selected class-specific predictor indicator from the displayed plurality of class-specific predictor indicators;

generating a class-specific predictor indicator importance for the selected class-specific predictor indicator by merging a term predictor indicator frequency and a purity predictor indicator frequency at each instance of the selected class-specific predictor indicator within one or more nodes of the tree structure; and causing a second display, in the graphical user interface, of the representation of the tree structure, wherein each path between a root node of the tree structure and a leaf node mapped to the selected class label subgroup having a node containing an instance of the selected class-specific predictor indicator is depicted in a manner that contrasts with other paths between the root node and other leaf nodes of the tree structure.

10. The system of claim 9, wherein
the determining the purity predictor indicator frequency at an instance of the selected class-specific predictor indicator comprises determining all class records contained in one of one or more leaf nodes mapped to the selected class label subgroup and all class records corresponding to the selected class label subgroup contained in a node corresponding to the class-specific predictor indicator on a path between the one of one or more leaf nodes and the root node.

11. The system of claim 9, wherein
the determining the term predictor indicator frequency at an instance of the selected class-specific predictor indicator comprises determining all class records corresponding to the selected class label subgroup that are contained in one of one or more leaf nodes mapped to the selected class label subgroup and all class records corresponding to the selected class label subgroup.

12. The system of claim 9, wherein
the determining the term predictor indicator frequency at an instance of the selected class-specific predictor indicator comprises determining all class records contained in one of one or more leaf nodes mapped to the selected class label subgroup and all class records corresponding to the class label subgroup.

13. The system of claim 9, wherein
the representation of the tree structure in the second display depicts each path between a root node of the tree structure and a leaf node mapped to the selected class label subgroup having a node containing an instance of the selected class-specific predictor indicator as highlighted, in a color different from a color of the other paths, or as having a line weight or branch structure different from that of the other paths.

14. The system of claim 9, wherein
the prediction model having the tree structure is generated using a C5.0 machine learning algorithm.

15. The system of claim 9, wherein
the selected class label subgroup comprises the plurality of class label subgroups; and the generating a class-specific predictor indicator importance comprises generating a distinct class-specific predictor indicator importance for each of the plurality of class label subgroups.

16. The system of claim 9, wherein the processor is configured to initiate operations further including:
determining a class-specific predictor importance of a predictor of the predictor model based on at least one class-specific predictor importance corresponding to the predictor.

17. A computer program product, the computer program product comprising:
one or more computer-readable storage media and program instructions collectively stored on the one or more computer-readable storage media, the program instructions executable by a processor to cause the processor to initiate operations including:

generating a prediction model having
a tree structure including a plurality of nodes,
a plurality of class label subgroups, and
a plurality of class-specific predictor indicators;

causing a first display, in a graphical user interface, of a representation of the tree structure including the plurality of class label subgroups and the plurality of class-specific predictor indicators;

receiving, based upon a user input, a selected class label subgroup from the displayed plurality of class label subgroups and a selected class-specific predictor indicator from the displayed plurality of class-specific predictor indicators;

generating a class-specific predictor indicator importance for the selected class-specific predictor indicator by merging a term predictor indicator frequency and a purity predictor indicator frequency at each instance of the selected class-specific predictor indicator within one or more nodes of the tree structure; and causing a second display, in the graphical user interface, of the representation of the tree structure, wherein each path between a root node of the tree structure and a leaf node mapped to the selected class label subgroup having a node containing an instance of the selected class-specific predictor indicator is depicted in a manner that contrasts with other paths between the root node and other leaf nodes of the tree structure.

18. The computer program product of claim 17, wherein
the determining the purity predictor indicator frequency at an instance of the selected class-specific predictor indicator comprises determining all class records contained in one of one or more leaf nodes mapped to the selected class label subgroup and all class records corresponding to the selected class label subgroup contained in a node corresponding to the class-specific predictor indicator on a path between the one of one or more leaf nodes and the root node.

19. The computer program product of claim 17, wherein
the determining the term predictor indicator frequency at an instance of the selected class-specific predictor indicator comprises determining all class records corresponding to the selected class label subgroup that are contained in one of one or more leaf nodes mapped to the selected class label subgroup and all class records corresponding to the selected class label subgroup.

20. The computer program product of claim 17, wherein
the determining the term predictor indicator frequency at an instance of the selected class-specific predictor indicator comprises determining all class records contained in one of one or more leaf nodes mapped to the selected class label subgroup and all class records corresponding to the class label subgroup.

* * * * *